United States Patent
Eliasson

(10) Patent No.: US 12,505,553 B2
(45) Date of Patent: Dec. 23, 2025

(54) INSPECTION SYSTEM

(71) Applicant: Vitrox Technologies Sdn Bhd, Bandar Cassia (MY)

(72) Inventor: Tracy Eliasson, Boulder, CO (US)

(73) Assignee: Vitrox Technologies Sdn Bhd, Bandar Cassia (MY)

( * ) Notice: Subject to any disclaimer, the term of this patent is extended or adjusted under 35 U.S.C. 154(b) by 400 days.

(21) Appl. No.: 18/109,741

(22) Filed: Feb. 14, 2023

(65) Prior Publication Data

US 2023/0260128 A1 Aug. 17, 2023

(30) Foreign Application Priority Data

Feb. 15, 2022 (MY) ............................. PI2022000857

(51) Int. Cl.
*G06K 9/00* (2022.01)
*G06T 7/11* (2017.01)

(52) U.S. Cl.
CPC ........ *G06T 7/11* (2017.01); *G06T 2207/10116* (2013.01); *G06T 2207/20081* (2013.01); *G06T 2207/30141* (2013.01)

(58) Field of Classification Search
CPC ............. G06T 7/11; G06T 2207/10116; G06T 2207/20081; G06T 2207/30141; G06T 7/0004; G01N 21/956; G01N 2021/95638
See application file for complete search history.

(56) References Cited

U.S. PATENT DOCUMENTS

| | | | |
|---|---|---|---|
| 7,171,038 B2 * | 1/2007 | Adler | G03F 7/7065 |
| | | | 250/307 |
| 7,245,693 B2 | 7/2007 | Buck et al. | |
| 7,424,141 B2 | 9/2008 | Gines et al. | |
| 9,546,964 B2 * | 1/2017 | Li | G01N 21/8806 |
| 10,082,470 B2 * | 9/2018 | Shortt | G01N 21/8806 |
| 11,047,806 B2 * | 6/2021 | Bhattacharyya | G01N 23/04 |
| 11,872,071 B2 * | 1/2024 | Pivot | A61B 6/4208 |
| 12,020,417 B2 * | 6/2024 | Buzaglo | G01N 21/8851 |
| 2007/0013772 A1 * | 1/2007 | Tham | G01R 31/309 |
| | | | 348/87 |

FOREIGN PATENT DOCUMENTS

| | | | | |
|---|---|---|---|---|
| CN | 109146082 B | * | 4/2020 | ............ B25J 19/023 |
| JP | 2004226126 A | * | 8/2004 | ............ G01G 13/08 |
| KR | 20170069178 | | 6/2017 | |
| KR | 20180095972 | | 8/2018 | |

OTHER PUBLICATIONS

English Abstract of KR20170069178.
English Abstract of KR20180095972.

* cited by examiner

*Primary Examiner* — Shervin K Nakhjavan
(74) *Attorney, Agent, or Firm* — PRESTON SMIRMAN SMIRMAN IP LAW, PLLC

(57) ABSTRACT

The present invention discloses an inspection system comprising a plurality of detectors (10) for inspecting an object, the plurality of detectors (10) sharing one or more imaging chains for inspecting a plurality of regions of interest on the object being inspected, wherein the detectors (10) capture images of the object using a combination of different imaging modes, and each region of interest is inspected by one or more detectors (10).

17 Claims, 3 Drawing Sheets

INSPECTION SYSTEM

CROSS-REFERENCE TO RELATED APPLICATION

The instant application claims priority to Malaysia Patent Application Serial No. PI2022000857 filed Feb. 15, 2022, the entire specification of which is expressly incorporated herein by reference.

FIELD OF THE INVENTION

The present invention relates to an inspection system, more particularly an x-ray imaging system utilizing a hybrid configuration of a plurality of linear scanning detectors, and a plurality of area mode detectors.

BACKGROUND OF THE INVENTION

Historically, for printed circuit boards, manual visual inspection was used to detect board substrate damage, missing components, misplaced components, damaged components, soldering faults, and other quality defects that can be observed by eye. Manual visual inspection is known to be incapable of effective defect detection for most modern electronics because manual visual inspection is both slow and has poor repeatability. Automatic optical inspection systems improve upon manual visual inspection in many modern installations. However, these automatic optical inspection systems can only detect defects that appear on the surface of the examined objects. For interior defects or hidden joints such as Ball Grid Arrays (BGAs), these optical inspection systems cannot provide test coverage. The use of automated X-ray imaging provides inspection for both visible and hidden defect types. Traditional transmission X-ray image, often referred to as a 2-D image, can generally provide some clues of the defects. The usefulness of transmission images is limited with double-sided printed circuit assemblies (PCAs), and other multi-layer inspection situations such as package on package. To provide a more reliable and accurate information about the defect, 3-D x-ray techniques such as computed tomography, digital tomosynthesis, and laminography can be utilized. Computed tomography is known to require more processing power, and so typically longer processing times, as compared to digital tomosynthesis and laminography.

Many technologies have been implemented to improve on the X-ray imaging system for inspecting objects. One such example is a United States patent with publication no. U.S. Pat. No. 7,424,141B2 which discloses a system and method for performing auto-focusing operations for tomosynthetic reconstruction of images, more specifically a system and method for efficiently computing the gradient of one or more depth layers of an object under inspection, wherein such gradients may be used in performing auto-focusing operations to determine a depth layer that includes an in-focus view of a feature that is of interest. In at least one embodiment, a method is provided that comprises capturing detector image data for an object under inspection and using the detector image data for computing gradient information for at least one depth layer of the object under inspection without first tomosynthetically reconstructing a full image of the at least one depth layer. Another United States patent with publication no. U.S. Pat. No. 7,245,693B2 discloses an x-ray inspection system which includes an x-ray source, an on-axis x-ray sensor, at least one off-axis x-ray sensor, a fixture, and an accumulation circuit. The on-axis x-ray sensor is configured to capture on-axis images of radiation from the x-ray source, which is displaced form the on-axis x-ray sensor, and the x-ray source and the on-axis x-ray sensor are positioned on an axis conceptually drawn between the x-ray source and the on-axis x-ray sensor. At least one off-axis x-ray sensor is configured to capture off-axis images of radiation from the x-ray source, wherein each off-axis x-ray sensor is positioned off the axis. The fixture is configured to maintain an article between the x-ray source and the on-axis and off-axis x-ray sensors, and the accumulation circuit is configured to receive and accumulate images captured by the on-axis and off-axis x-ray sensors. A Korean patent with publication no. KR20170069178A discloses a multi-optic module vision inspection system which includes a dustproof device having an air cylinder structure for vibration reduction and a stage unit transfer module and a mechanical part for sample products having various shapes and sizes in the field of semiconductor materials, and display materials in the inspection equipment, such that the system is capable of detecting surface defects on an object. Another Korean patent with publication no. KR20180095972A discloses a high speed automatic optical inspection apparatus comprising an image inspection device for photographing an image of an object to be inspected, a control device for controlling the image inspection device in terms of its camera and lighting, and analysing an image photographed by the image inspection device to inspect the quality of the object to be inspected. A worktable is also included for loading of the object to be inspected.

The aforementioned prior arts describe the many configurations of X-ray imaging systems for inspecting objects. A drawback arises from using only linear scanning or area mode inspection within a system as each technology has its own strengths and weaknesses. Given a typical PCA, the mix of components will require different test strategies for different solder joints on the PCA. Area mode systems are generally more efficient for smaller test regions while linear scanning systems are more efficient for larger regions. Given only one imaging chain, be it area mode or linear scanning mode, that imaging chain must be used in both its strong use cases and its weak ones. This is a drawback to single-mode imaging chain systems. A hybrid solution with one or more complimentary imaging chains allows for each imaging chain to be used in its strength more often, and so, an overall better inspection result to be achieved.

SUMMARY OF THE INVENTION

An object of the present invention is to produce an inspection system that utilizes one or more area mode detectors in one imaging chain and one or more linear scanning detectors in another complimentary imaging chain. Area mode detectors can also provide higher camera array fill factors, and so, capture more of the existing signal which would result in higher signal-to-noise images using the same x-ray tube settings, geometry and speed.

In one aspect of the present invention, there is provided an inspection system comprising a plurality of detectors for inspecting an object, the plurality of detectors sharing one or more imaging chain components for inspecting a plurality of regions of interest on the object being inspected, wherein the detectors capture images of the object using a combination of different imaging modes, and each region of interest is inspected by one or more detectors.

Preferably, wherein the plurality of detectors includes any one or a combination of a linear scan detector and an area mode detector.

Preferably, wherein the area mode detector includes a flat panel detector.

Preferably, the different imaging modes include a linear scan imaging mode conducted by a linear scan detector, an area imaging mode conducted by the area mode detector, or a combination thereof.

Preferably, the imaging chains utilize x-ray detectors which operate simultaneously.

Preferably, a cost function measures any one or a combination of inspection time and inspection cost.

Preferably, the cost function is based on a model of system behaviour, experimental data collection from system operation, or a combination thereof.

Preferably, the cost function is a function of an area of the region of interest, a thickness of the region of interest, a size of inspectable features within the region of interest, or a combination thereof.

Preferably, the regions of interest on the object being inspected are assigned based on optimization of the cost function.

Preferably, the optimization is subjected to constraints including image quality metrics.

Preferably, the image quality metrics include any one or a combination of signal-to-noise ratio, resolution, bit depth, and other metrics known to measure goodness of images.

In another aspect of the present invention, there is provided a method for inspecting an object comprising the steps of capturing images of the object using an inspection system that comprises a plurality of detectors sharing one or more imaging chain components for inspecting a plurality of regions of interest on the object, wherein the detectors capture images of the object using a combination of different imaging modes, and each region of interest is inspected by one or more detectors.

Preferably, the plurality of detectors includes any one or a combination of a linear scan detector and an area mode detector.

Preferably, the area mode detector includes a flat panel detector.

Preferably, the different imaging modes include a linear scan imaging mode conducted by the linear scan detector, an area imaging mode conducted by the area mode detector, or a combination thereof.

Preferably, the method further comprises utilizing x-ray detectors by the imaging chains.

Preferably, the method further comprises the step of assigning the imaging chains to each region of interest using a cost function.

Preferably, the cost function measures any one or a combination of inspection time and inspection cost.

Preferably, the cost function is based on a model of system behaviour, experimental data collection from system operation, or a combination thereof.

Preferably, the cost function is a function of an area of the region of interest, a thickness of the region of interest, a size of inspectable features within the region of interest, or a combination thereof.

Preferably, the regions of interest on the object being inspected are assigned based on optimization of the cost function.

Preferably, the optimization is subjected to constraints including image quality metrics.

Preferably, the image quality metrics include any one or a combination of signal-to-noise ratio, resolution, and bit depth.

Preferably, optimization is achieved when either or both inspection time is minimized and image quality is maximized.

Preferably, the constraints are sorted to regroup the regions of interest when constraint values are either met or exceeded.

One skilled in the art will readily appreciate that the present invention is well adapted to carry out the objects and obtain the ends and advantages mentioned, as well as those inherent therein. The embodiment described herein is not intended as limitations on the scope of the invention.

BRIEF DESCRIPTION OF THE DRAWINGS

For the purpose of facilitating an understanding of the invention, there is illustrated in the accompanying drawing the preferred embodiments from an inspection of which when considered in connection with the following description, the invention, its construction and operation and many of its advantages would be readily understood and appreciated.

DETAILED DESCRIPTION OF THE INVENTION

Hereinafter, the invention shall be described according to the preferred embodiments of the present invention and by referring to the accompanying description and drawings. However, it is to be understood that limiting the description to the preferred embodiments of the invention is merely to facilitate discussion of the present invention and it is envisioned that those skilled in the art may devise various modifications without departing from the scope of the appended claim.

Figure 1:
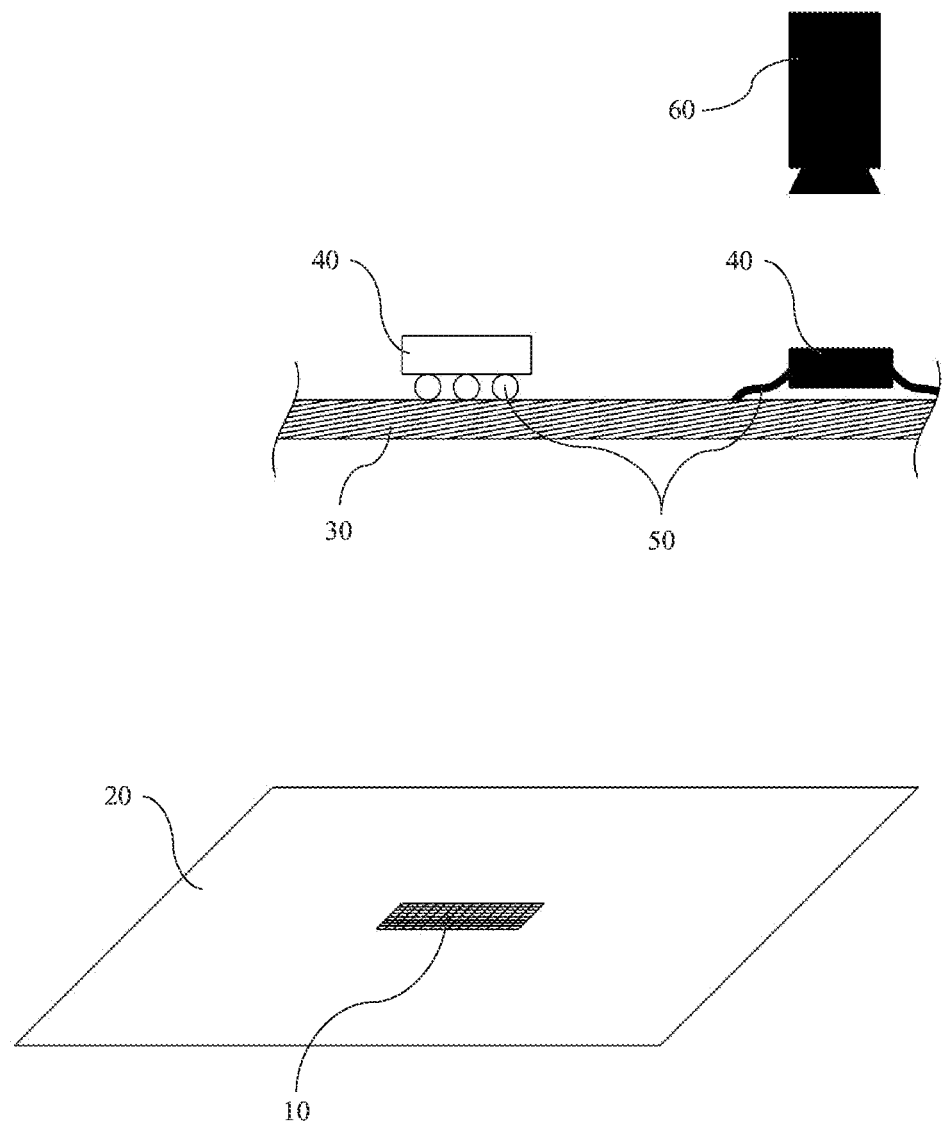
FIG. 1 illustrates a preferred embodiment of an X-ray imaging system.

FIG. 1 illustrates an X-ray imaging system for inspecting an object, such as solder joints on a printed circuit assembly (PCA), the system comprising image capturing means 10 for capturing images of an object being inspected 30. An x-ray source 60 emits x-rays that are attenuated by the object being inspected, 30, the components, 40, as well as the solder joints, 50. The remaining x-ray power falls upon the imaging plane, 20 where the detectors 10 are used to collect x-ray images of all x-ray attenuating materials between the x-ray source, 60 and the detector, 10. Particularly, the X-ray imaging system may be employed for inspection of wafers, printed circuit assemblies (PCAs), semiconductors or the likes. In a preferred embodiment, the inspection system utilizes a technique known as digital tomosynthesis, which is a digital version of laminography, whereby a set of images of different views are stored and synthesized through computational operations in a computing device. Moreover, it has been known that any arbitrary cross-section could be achieved with the given image set through modifying the technique. This may provide users with an efficient and useful function for inspecting and monitoring object quality.

Firstly, the synthesized cross-section images make it possible to inspect the defects on different layers within an object. Secondly, a series of synthesized adjacent layers may be used to visualise the object's 3-D volume, which provides easy understanding of the 3D information of the object being inspected and its internal defects. In order to realize the digital tomosynthesis method for real time inspection of printed circuit assemblies (PCAs), a fast and sensitive x-ray detector with suitable detectors are required. As illustrated in FIG. 1, an x-ray source is provided which projects x-rays through an x-ray tube 60 to an imaging plane 20 where the image of the object is being projected. Preferably, the x-ray source is projected towards the detectors as illustrated in FIG. 1 by being disposed above the detectors 10 and may be secured to an x-ray gantry to allow movement of the x-ray tube 60 alongside the detectors 10 as images of the object being inspected are being captured. In this preferred embodiment, the x-ray tube 60 may be shared between complimentary imaging chains alongside a panel handler and a network switch, which may act as a hub for transferring information between each component in the inspection system. In a preferred embodiment, object under test 30 may be a test area within a panel or a tray in which the objects to be inspected are loaded onto. In a preferred embodiment, the X-ray imaging system may be used to detect and inspect any form of defects that may be present on the object, particularly. The defects may include by way of example but not limited to, solder bridges, lifted pads, webbing and splashes, too much solder, cold joints or the likes.

Figure 2A:
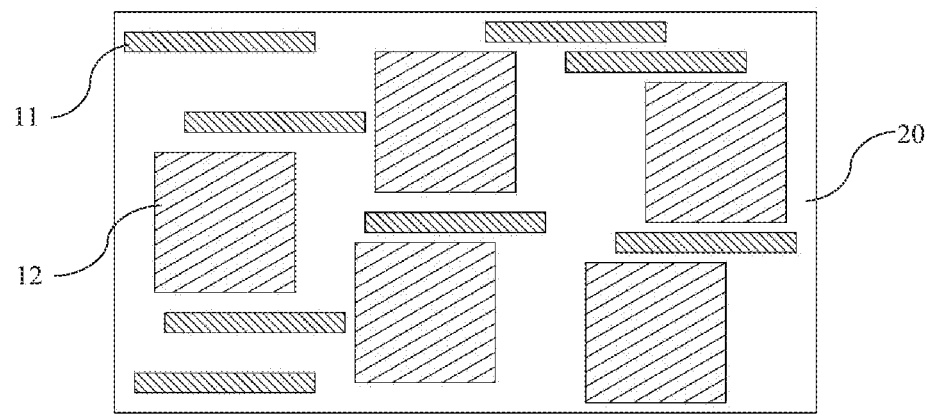
FIG. 2A illustrates a top view of an imaging plane with coverage by a combination of a line scan camera and an area scan camera.
Figure 2B:
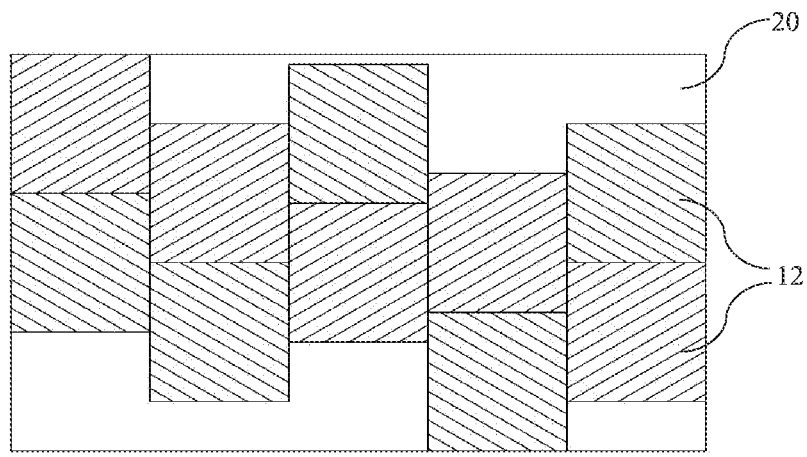
FIG. 2B illustrates a top view of the imaging plane with coverage by the area scan camera.
Figure 2C:
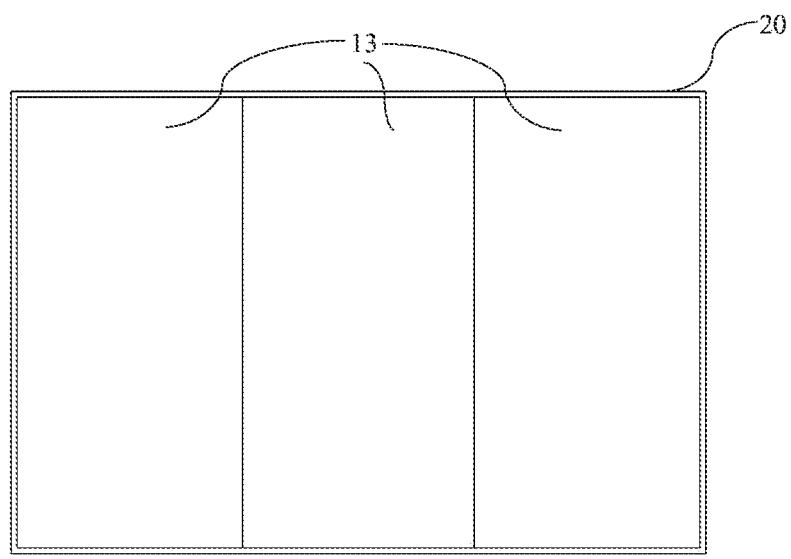
FIG. 2C illustrates a top view of the imaging plane with coverage by flat panel detectors.

Referring to FIG. 2A to FIG. 2C, the plurality of detectors 10 may include any one or a combination of a linear scan detector 11 and an area mode detector 12, in which the area mode detector 12 may include a flat panel detector 13. The linear scan detector 11 uses a plurality of rows of light-sensitive pixels that image cross the object being inspected, line-by-line, using high intensity lighting, such that a complete image may be built by stitching together those lines. For two-dimensional image acquisition, relative motion between the x-ray source and object under test is required. Linear scan detectors 11 are capable of collecting high resolution images even when there is relative motion between the source, object under test, and detector. It is possible to configure an imaging chain with linear detectors 11 in such a way that the motion is synchronized with the camera trigger. This enables motion in parallel with image collection and so reduces the overall time to collect many images. Area mode detectors 12 require that there is no relative motion between source, object to image, and detector during image collection. A downside of motion synchronization is that some extra motion is required to achieve the sync. If the object to image is large then this extra motion becomes insignificant and the imaging chain that utilizes linear scan detectors is faster. In cases where the object to image is small then this extra motion is significant and the imaging chain that utilizes area mode detectors is faster. Additionally the lower cost of linear scan detectors enables adoption of a camera array consisting of randomly accessible image detectors, further reducing image collection time as compared to a single area mode detector. The detectors within the camera array could be implemented with a control circuit responsible for translating from an imaginary camera's position to a real camera's address, such as utilized by the area mode detectors 12.

In another embodiment, the flat panel detectors 13 may be used to reduce the number of linear scan detectors 11 required to capture images of the object being inspected. However, image acquisition settings may have to be altered to adapt to the flat panel detectors 13 as said panel detectors 13 may not use similar settings as compared to linear scan detectors 11. The flat panel detectors 13 are digital radiography devices that either convert X-rays into an electrical charge via direct conversion, or from X-rays into light via indirect conversion, which is then read through thin film transistors. Imaging principles used in flat panel detectors 13 are similar to those of imaging sensors used in digital photography and video cameras. Advantageously, flat panel detectors 13 are known for their durability, portability, time saving, cost savings, better image quality and lower radiation doses. Additionally, flat panel detectors 13 have higher fill factors in comparison to the line scan camera and the area scan camera, in which the flat panel detectors 13 capture more light, in turn improves system efficiency.

In a preferred embodiment, the detectors 10 may capture images of the object being inspected at a plurality of regions of interest on said object, using a combination of different imaging modes, with each region of interest being inspected by one or more detectors 10. The different imaging modes may include a linear scan imaging mode conducted by the linear scan detector 11, an area imaging mode conducted by the area mode detector 12, or a combination thereof. Preferably, the linear scan imaging mode may include a time-delay integration (TDI) imaging mode which uses multiple linear scan stages, whereby line information is copied line by line synchronously with movement of the object and exposed with same image information. In a preferred embodiment, the regions of interest may be imaged using both the area imaging mode and TDI imaging mode whereby the captured images may likely be processed together into one reconstructed image with more information than was available from either of the detector types independently.

In a preferred embodiment, the detectors 10 may be configured with a set of image acquisition settings which may include any one or a combination of a nominal resolution, a region aspect ratio and type of imaging mode. Also preferably, the imaging chain resolution corresponds to sizes of the object being inspected, such that the detectors 10 are able to capture the entire object within said resolution, and the aspect ratio may coincide with the area of the panel in which the object is being inspected on. In another preferred embodiment, the central control module may systematically select the appropriate imaging modes using machine learning algorithms depending on the nominal resolution and the aspect ratio, such that a suitable detector 10, may be used to capture the images of the object being inspected. Particularly, the machine learning algorithms employed may be trained with a set of training images obtained from a database which comprises the type of object being inspected, the type of defects, insufficient and sufficient imaging samples, and the suitable imaging mode required to capture images of the object.

In a preferred embodiment, the one or more imaging chains may be assigned to each region of interest using a cost function, whereby the cost function measures any one or a combination of inspection time and inspection cost. Preferably, the cost function may be based on a model of system behaviour, experimental data collection from system operation, or a combination thereof. Further, the cost function may also be a function of an area of the region of interest, a thickness of the region of interest, a size of inspectable features within the region of interest or a combination thereof. In an exemplary embodiment, the equation below is a generalized equation for the cost function:

Let $w$=width of area to image;

Let $l$=length of area to image;

Let $t$=thickness of area to image;

Let $A$=area=$w*l$;

Let $P$=perimeter=$2w+2l$;

Let $C1$ be the cost function for imaging chain 1;

Let $C2$ be the cost function for imaging chain 2;

$C1=2*A+4000$; and $C2=3*A$;

wherein, the area, A, to be imaged may include either or both an entire panel, or a smaller region.

In a preferred embodiment, each region of interest may be inspected with only one of the plurality of detector types, either or both the linear scan detector 11 and the area mode detector 12, depending on the type of imaging mode being employed as well. Preferably, the regions of interest on the object being inspected are assigned based on optimization of the cost function, in which the optimization is subjected to constraints including image quality metrics. The image quality metrics may include any one or a combination of signal-to-noise ratio, resolution, angular entropy, and bit depth. Angular entropy refers to angular information of the captured images, such that angular entropy increases with number of angles and increases if angles are well spread around available angular space of the object being inspected. Besides that, signal-to-noise ratio refers to a measurement that compares a level of a desired signal to a level of background noise and is often expressed in decibels. Further, bit depth is colour information stored in the captured image, in which the higher the bit depth of the image, the more colours it can store. In a preferred embodiment, the optimization subjected to the combination of any one of the image quality metrics may be achieved when either or both inspection time is minimized and image quality is maximized.

Figure 3:
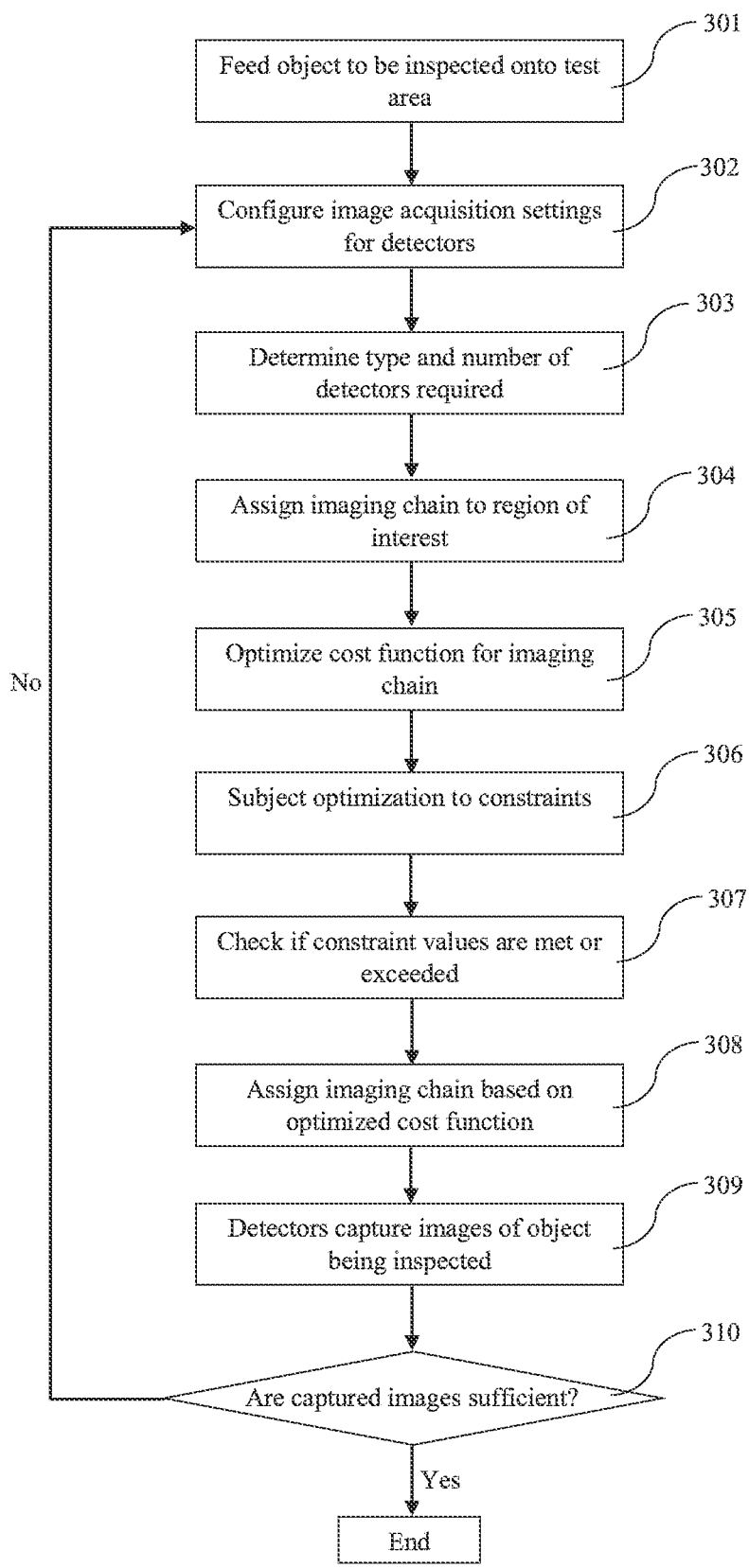
FIG. 3 illustrates a flow chart of a method for inspecting objects based on the above-mentioned X-ray imaging system.

In an aspect of the present invention, there is provided a method for inspecting the object such as illustrated in FIG. 3. At Step 301, the object to be inspected is fed into a test area. At Step 302, image acquisition settings of the detectors 10 may be configured accordingly by the central control module to acquire the highest quality images as captured by the detectors 10. At Step 303, the central control module may determine the type and the number of detectors 10 required to capture images of the object being inspected. Particularly, either a plurality of the linear scan detectors 11 or the area mode detectors 12 may be employed, or a combination thereof. At Step 304, the central control module may then be configured to assign any one or the combination of imaging chains to inspect a plurality of regions of interest on the object being inspected. At Step 305, the cost function is optimized in order to assign the imaging chains to respective regions of interests on the object being inspected. The optimization may then be subjected to constraints such as image quality metrics which may include any one or a combination of signal-to-noise ratio, resolution, angular entropy and bit depth, as illustrated in Step 306. At Step 307, the central control module then checks if the constraint values are either met or exceeded, such that constraints may be sorted for regrouping the regions of interest. At Step 308, the imaging chains with the appropriate detectors 10 may then be assigned to each region of interest using the cost function which was optimized. Upon assignment of region of interest, the detectors 10 may then capture images at Step 309. The captured images may then be inspected and analysed for sufficiency prior to being reconstructed as an overall image at Step 310. If the captured images are found to be insufficient for reconstruction, the image acquisition settings may be modified automatically in order to acquire the highest quality image of the object being inspected. Advantageously, the hybrid configuration of the linear scan imaging mode and the area imaging mode using the area mode detectors 12 allows users to inspect most areas of the object in the regions of interest which are typically hidden from view. Further, the combination of the different imaging chains allows for higher flexibility in inspection of the objects and is able to overcome corner cases during inspection. Advantageously, the hybrid configuration of the linear scan imaging mode and the area imaging mode using the area mode detectors 12 allows users to inspect most areas of the object being inspected in the regions of interest which are typically hidden from view. Further, the combination of the different imaging chains allows for higher flexibility in inspection of the objects and is able to overcome corner cases during inspection.

The present disclosure includes as contained in the appended claims, as well as that of the foregoing description. Although this invention has been described in its preferred form with a degree of particularly, it is understood that the present disclosure of the preferred form has been made only by way of example and that numerous changes in the details of construction and the combination and arrangements of parts may be resorted to without departing from the scope of the invention.

What is claimed is:

1. An inspection system, comprising:
   a control module; and
   a plurality of detectors for inspecting an object;
   wherein the detectors include one or more linear scan detectors and one or more area mode detectors;
   wherein the linear scan detectors are part of one imaging chain, and the area mode detectors are part of another imaging chain; and
   wherein the control module is configured to assign one or a combination of imaging chains to inspect a plurality of regions of interest on the object based on optimization of a cost function that is subjected to constraints which include image quality metrics, for the detectors of the assigned imaging chains to capture images of the object and inspect each region of interest on the object using one or a combination of different imaging modes as conducted by the linear scan detectors, the area mode detectors, or a combination thereof.

2. The inspection system according to claim 1, wherein the area mode detector includes a flat panel detector.

3. The inspection system according to claim 1, wherein the imaging modes include a linear scan imaging mode conducted by the linear scan detector, an area imaging mode conducted by the area mode detector, or a combination thereof.

4. The inspection system according to claim 1, wherein the imaging chain utilize x-ray detectors which operate simultaneously.

5. The inspection system according to claim 1, wherein the cost function measures any one or a combination of inspection time and inspection cost.

6. The inspection system according to claim 1, wherein the cost function is based on a model of system behaviour, experimental data collection from system operation, or a combination thereof.

7. The inspection system according to claim 1, wherein the cost function is a function of an area of the region of interest, a thickness of the region of interest, a size of inspectable features within the region of interest, or a combination thereof.

8. The inspection system according to claim 1, wherein the image quality metrics include any one or a combination of signal-to-noise ratio, resolution, bit depth, and other metrics known to measure goodness of images.

9. A method for inspecting an object comprising the steps of:
providing a control module; and
capturing images of the object using an inspection system that comprises a plurality of detectors;
wherein the detectors include one or more linear scan detectors and one or more area mode detectors;
wherein the linear scan detectors are part of one imaging chain, and the area mode detectors are part of another imaging chain; and
wherein the control module is configured to assign one or a combination of imaging chains to inspect a plurality of regions of interest on the object based on optimization of a cost function that is subjected to constraints which include image quality metrics, for the detectors of the assigned imaging chains to capture images of the object and inspect each region of interest on the object using one or a combination of different imaging modes as conducted by the linear scan detectors, the area mode detectors, or a combination thereof.

10. The method according to claim 9, wherein the area mode detector is a flat panel detector.

11. The method according to claim 9, further comprising utilizing x-ray detectors by the imaging chains which operate simultaneously.

12. The method according to claim 9, wherein the cost function measures any one or a combination of inspection time and inspection cost.

13. The method according to claim 12, wherein the cost function is based on a model of system behavior, experimental data collection from system operation, or a combination thereof.

14. The method according to claim 13, wherein the cost function is a function of an area of the region of interest, a thickness of the region of interest, a size of inspectable features within the region of interest, or a combination thereof.

15. The method according to claim 9, wherein the image quality metrics include any one or a combination of signal-to-noise ratio, resolution, angular entropy, and bit depth.

16. The method according to claim 15, wherein optimization is achieved when either or both inspection time is minimized and image quality is maximized.

17. The method according to claim 9, wherein the constraints are sorted to regroup the regions of interest when constraint values are either met or exceeded.

* * * * *